United States Patent [19]

Lerner et al.

[11] Patent Number: 5,712,978
[45] Date of Patent: Jan. 27, 1998

[54] SYSTEM FOR CONTROL OF REMOTE PROCESSORS

[75] Inventors: Michah Lerner, Brooklyn, N.Y.; Eric Sporel, Butler; S. Rao Vasireddy, Manalapan, both of N.J.

[73] Assignee: Lucent Technologies Inc., Murray Hill, N.J.

[21] Appl. No.: 366,631

[22] Filed: Dec. 30, 1994

[51] Int. Cl.$^6$ ............................................. G06F 11/30
[52] U.S. Cl. ............................. 395/200.11; 395/30
[58] Field of Search .................... 395/200.11, 800, 395/200.05, 189.01, 185.01, 12, 50; 371/16.1

[56] References Cited

U.S. PATENT DOCUMENTS

| | | | |
|---|---|---|---|
| 3,958,111 | 5/1976 | Hackett | 235/153 |
| 5,077,607 | 12/1991 | Johnson et al. | 358/86 |
| 5,233,611 | 8/1993 | Triantafyllos et al. | 371/16.1 |
| 5,255,361 | 10/1993 | Callaway et al. | 395/162 |
| 5,283,861 | 2/1994 | Dangler et al. | 395/149 |
| 5,349,675 | 9/1994 | Fitzgerald et al. | 395/800 |
| 5,444,849 | 8/1995 | Farrand et al. | 395/200.09 |

*Primary Examiner*—Mehmet B. Geckil

[57] ABSTRACT

A system and method for interacting a central host with at least one remote processor, wherein each remote processor executes software that generates remote screen data to maintain a screen display, the system comprising: a central processor; a memory connected to the central processor; a communications link connecting the central processor to a remote processor; wherein the central processor receives the remote screen data from the remote processor and stores the remote screen data in the memory, the system executing predetermined actions based on the remote screen data.

16 Claims, 1 Drawing Sheet

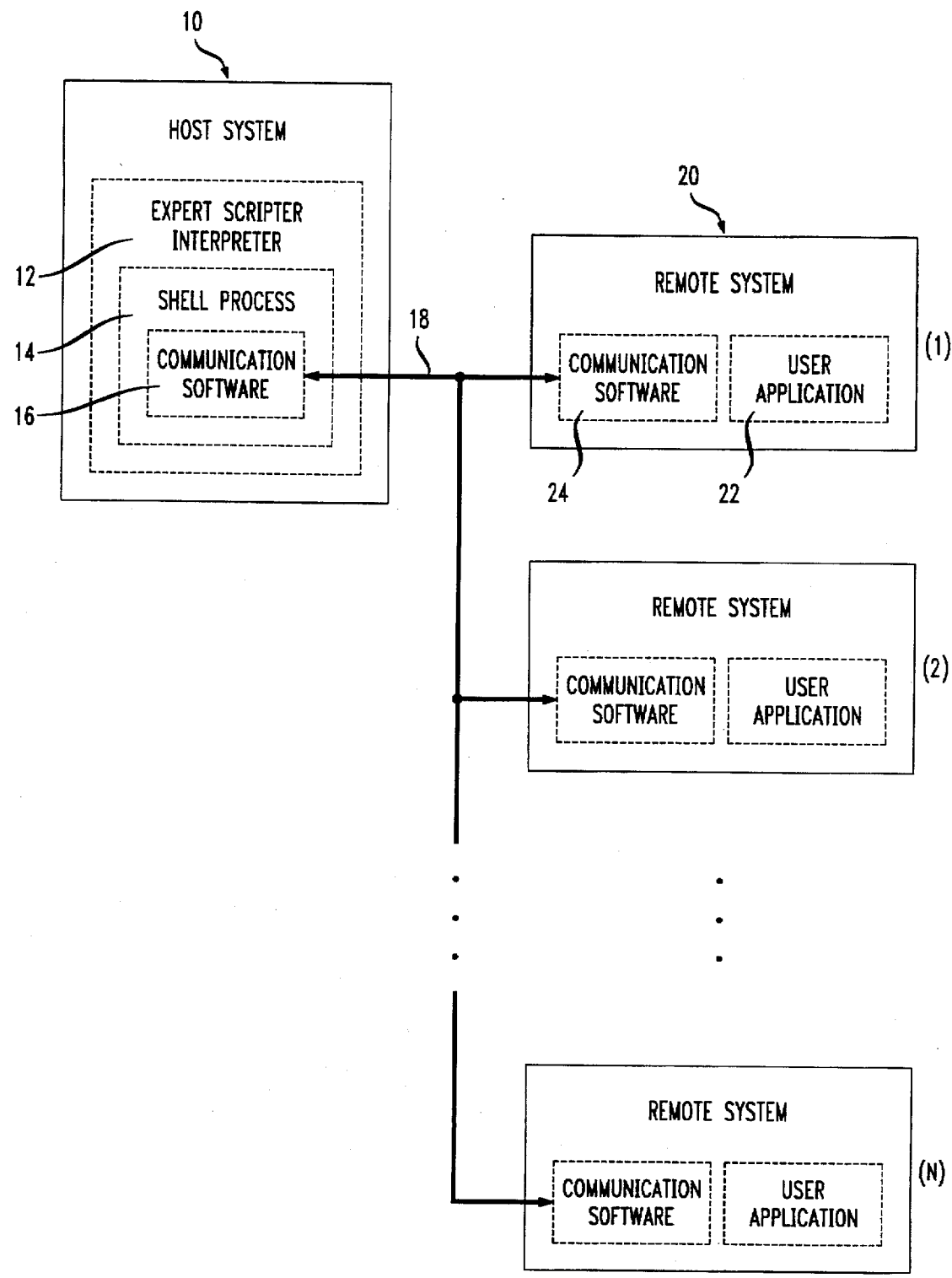

SYSTEM FOR CONTROL OF REMOTE PROCESSORS

FIELD OF THE INVENTION

This invention relates to the control of remote processors and, in particular, to a system that allows a central or host processor to interact with one or more remote processors.

BACKGROUND OF THE INVENTION

Remote processors may be used to implement a program at a location remote from a central office responsible for overseeing the remote applications. For example, AT&T uses a number of DOS PC computers dedicated to service-quality measurement of USADirect inbound international calls. These remote unattended test stations, located around the world, execute telephone quality monitoring software.

A central location is responsible for overall management of the test stations and needs to transmit updated instructions and data to each remote PC, and to retrieve information from the PCs concerning the quality of the USADirect service being implemented in the PC's area. This information is useful for maintaining a high quality of services in the remote areas.

While the use of remote stations permits monitoring or other services to be carried out in the remote area itself, the use of such stations provides challenges related to the management of the stations. It is difficult to run diagnostic programs on the remote stations from the central control area and to effectively interact with the remote stations without significant manual control by a human operator.

SUMMARY OF THE INVENTION

The disadvantages of the prior art have been overcome by the present invention which is a system that enables efficient interaction by a central system with a number of remote systems, where the central system captures remote screen data and uses the data to determine actions that are to be taken at the central system, and/or at the remote system.

In one aspect, the invention features a system for interacting with at least one remote processor, wherein each remote processor executes software that generates remote screen data to maintain a screen display, the system comprising: a central processor; a memory connected to the central processor; a communications link connecting the central processor to a remote processor; wherein the central processor receives the remote screen data from the remote processor and stores the remote screen data in the memory, the system executing predetermined actions based on the remote screen data.

In preferred embodiments, the system further includes a plurality of rules stored in the memory, the system selecting one or more of the rules for execution based on the remote screen data. Each rule can comprise a data portion and an action portion, with the system comparing the data portion to the remote screen data and utilizing the result of the comparison to determine whether the action portion of the rule will be executed.

The memory is preferably divided into a remote screen memory that maintains the remote screen data, a rules memory that stores a plurality of rules, and a working memory. The system stores, in the working memory, data that is generated by the system as a result of executing at least one rule. The system compares the data portion of each rule stored in the memory to data stored in the working memory to generate a list of rules that are eligible for execution based on the result of the comparison. The system then performs a second comparison to compare the data portion of each of the rules on the list with the remote screen data to generate a second list of rules that are eligible for execution based on the result of the second comparison.

Each remote processor can be incorporated in a personal computer that includes a monitor for displaying the screen data. The central processor can be a UNIX processor, and can establish a shell for communicating with each remote processor, the shell storing the remote screen data.

In another aspect, the invention features a method for operating a central processor to interact with at least one remote processor, wherein each remote processor executes software that generates remote screen data to maintain a screen display, the method comprising: establishing a communications link to a remote processor; receiving the remote screen data from the remote processor; storing the remote screen data in a memory associated with the central processor; and executing commands at the central processor based on the remote screen data stored in the memory.

The invention allows a central processor to have access to all of the information displayed on the screen at the remote system. Thus, whatever system is run by the remote processor, information that would be displayed on the remote screen is automatically transmitted to the central processor, allowing effective interaction between the central and remote processors. Other advantages of the invention will be apparent to those skilled in the art in view of the following detailed description.

BRIEF DESCRIPTION OF THE DRAWINGS

FIG. 1 is a block diagram of an expert system according to one embodiment of the invention.

DETAILED DESCRIPTION OF THE PREFERRED EMBODIMENTS

One embodiment of the invention will now be described in the context of an expert system operating on a central UNIX host. Referring to FIG. 1, the central host 10 includes an "expert scripter/interpreter" 12 (i.e., expert system) that establishes a shell process 14 and includes communications software 16. The shell process 14 is a running program established for communication with a number of remote systems 20 (numbered 1-N), connected with host 10 via communications lines 18. Shell process 14 communicates to remote systems 20 over communications line 18 using communications software 16.

Each remote system includes a suitable processor (e.g., a DOS or other PC) that runs a user application 22 and includes communications software 24. The preferred communications software includes LAN Workplace for DOS and XPC with Telnetd. This software allows remote login from host system 10 to each of the remote systems 20.

In the preferred embodiment the remote systems are monitoring a long distance service. The user application 22 in each remote system 20 receives input from a telephone network that provides services to customers (e.g., USADirect® calls from outside the U.S. to a destination within the U.S.). The host system 10 will perform the following actions to interact with the operation of the remote systems 20:

(1) Connect to a remote system 20 and:
   Log into the remote system
   Determine the status of the remote system; this may require full-screen analysis (explained below)
   Log errors and correct if appropriate Execute interactive programs with the remote system
Perform file-transfer to the remote system
Manipulate the remote from the host system
Restart the remote monitoring process
(2) Process the results
Place the results into a database
Monitor exceptional conditions The software run by the remote systems (i.e., the user applications 22) displays the system status on the remote system's monitor, and periodically executes pre-scheduled programs. The output of each user application is to the remote monitor and disk; and input is from its keyboard and the disk. The remote communications software 24 accepts keyboard input from the communication line 18 and transmits output to the system communications software 16.

Table 1, below, lists the system components, connected as shown in FIG. 1, with further explanation. The central host executes the expert system or "interpreter" and the outbound connections to the remote systems. The interpreter reads and writes to the local processes, invokes the communication programs that connect the local with the remote to permit the interactive interchange of data when the remote system makes modifications or updates to the information presented by the remote screen, and maintains a full screen image of the remote process. That is, the interpreter will duplicate locally (i.e., at the host) the screen display at the remote system. This enables the interpreter to access all of the information that the user application displays on its screen. The "rules" used by the expert system are explained further below and enable the execution of actions in response to data received from the remote system.

TABLE 1

System Components

| Component | Purpose | Location |
| --- | --- | --- |
| Central Host Expert System Controller | Execute expert system Recognize state of remote, select an appropriate rule, execute rule on local and remote systems | Local Central Host |
| Rules | Defines states, transitions and actions | Central Host |
| Connectivity, TCP/IP with PPP, ethernet, tip, or cu | Communication | Central Host (Morningstar PPP) Remote (Novell LWP with XPC) |
| Remote Controller | Permit control of remote system (keyboard and screen) over communication line | Remote DOS uses Novell XPC UNIX uses telnetd |
| Remote Systems | Execute application | Remote |

Remote control software, active on the remote, presents the remote system's application to the host (local) interpreter. The rules then determine the state of the remote and execute appropriate actions both locally (i.e., at the host) and remotely.

Statements or "rules" in the interpreter "language" are match-pattern/action pairs. The match-pattern portion specifies a required state of the local memory ("match" portion) and the configuration on the remote screen ("pattern" portion) for the rule to be implemented. The action states the response that is transmitted to the remote (if the rule is selected for execution), plus the statements to be executed locally at the host.

The host system operates on three forms of memory: rules memory, working memory, and the remote screen memory. The rules match the working memory and screen. In other words, the rules describe the conditions that the expert system will respond to, based on the content of working memory and the remote screen, and the actions that it will perform. Thus, it matches patterns in the working memory and the remote screen memory, and tests logical conditions on the result.

The working memory is a structured list of character strings. It represents partial results accumulated during interpretation of the rules. Elements are added to, as well as deleted from, the working memory during system operation. Its uses include storage of system state, work item lists, partial results, and data carried between steps.

The remote screen memory or pattern memory is the full screen representation of the remote system display (or other shell process). This is maintained current by interpreting the control codes of the input stream from the remote processor to perform, for example, the ANSI (vt100) functions such as insert/delete/move-cursor. In other words, all of the data generated by the user application to control the display at the remote system is transmitted to the shell process of the host system so that the duplicate screen at the host can be maintained and updated when appropriate.

The transmission of the data from the remote system to form the remote screen at the host can begin under the control of the host, e.g., with the host sending a command to the remote system. Alternatively, the host can simply log into the remote system and start receiving data automatically. Either way, it is preferable that updates to the remote screen be sent to the host automatically as the remote process updates the remote screen.

The expert system performs an execution cycle that has the following basic steps:

1. Recognize: find all rules that match the working memory (computes a Cartesian product of matching memory)
2. Select: perform a screen-memory match and conditional logical test on the results that passed the above test, and select one rule according to a conflict resolution method
3. Act: execute the rule, which can consist of a remote action, a local action, working memory modifications, and control-state modifications
4. Read: optionally, read the remote system for more input.

The system additionally monitors resource utilization, and adds the special working memory "RESOURCELIMIT" if these resources are exceeded. Thus, limits on memory use are established and are not exceeded.

As noted above, each rule includes a match portion, a pattern portion, and an action. Other possible components of a rule are listed in Table 2 below.

TABLE 2

Rule Components

| Item | Purpose | Syntax | Variables |
|---|---|---|---|
| label | Identify the rule | String | (none) |
| match | A list of extended regular expressions and/or negated regular expressions that must/must not be found in the working memory to permit consideration of the rule | Standard extended regular expresion notation consisting of characters, negation, definite and indefinite repetition characters (+,*), grouping (parenthesis or braces) and saving of match results ($n where n is a digit from 0 to 9), as provided, for example, by the Solaris (a UNIX operating system available from Sun MicroSystems) "regcmp" command. | $W0 to $W9 match working memory expressions |
| pattern | An extended regular expression that must match the screen memory to permit consideration of the rule. (Shell-remote screen) | (Same as "match" above.) | $0 to $9 match pattern expressions |
| line | The range of screen lines where the pattern is eligible to match the output of the persistent shell process or remote screen | $N_1:N_2$ where $N_i$ is the line number. −1 indicates the bottom most line in use. Lines may be scanned in any direction | (none) |
| condition | A list of arithmetic or logical statements that are first instantiated with the value that matched the working memory and pattern elements, and then evaluated to determine if these memories satisfies the rule | expression relop primary; Primary is variable, value or function. Expression is primary or primary operator expression. Relop is lt, le eq, ge, gt, and compares the expression with the primary. Variables are $0, . . . $9, $W0, . . . $W9. Value is real, and the functions are listed in Table 4. | $i, $Wi, saved values from the host computer environment. |
| response | A command that is instantiated with memory and pattern elements, and then transmitted to the remote | Character sequence with variables, functions, \n (newline) \r (return) \w (wait) and \\ (\) | $i, $Wi, saved values from the host computer environment $ADD, $SUB |
| action | A command that is instantiated with memory and pattern elements, and then executed locally | Character sequence with variables, functions, \n (newline) \r (return) \w (wait) and \\ (\) | $i, $Wi, saved values from the host computer environment, $SHELL |
| add | A list of working memory patterns to be added to working memory after instantiation with the match and pattern elements | Sequence of variables, values and functions, or parenthesized sequences of such sequences (nesting allowed) | $i, $Wi, saved values from the host computer environment, $ADD, $SUB, $SHELL |
| delete | A list of working memory patterns to be deleted from the working memory after instantiation with the match and pattern elements | Character sequence with variables, functions \n (newline) \r (return) \w (wait) and \\ (\) | $i, $Wi, saved values from the host computer environment, $ADD, $SUB $SHELL |
| log | A log entry that is prefixed with the date, time, user id and directory where the scripter is executing | Character sequence with variables and functions. | $i, $Wi, saved values from the host computer environment, $ADD, $SUB, $SHELL |

TABLE 2-continued

Rule Components

| Item | Purpose | Syntax | Variables |
|---|---|---|---|
| count | Maximum usage count for the rule | Numeric | (none) |
| readmore | Require shell response from rule | 0 (do not wait) or 1 (wait) | |
| mods | Modifications to rule count and system parameters | Sequence of (rule-value;) or (\special=value;) See Table 3. | Rule count and resource control |

The modification codes or "mods" listed in Table 2 are used to alter the rule count or other system parameters, and include the codes listed in Table 3 below.

TABLE 3

Modification Control Codes

| Variable | Function |
|---|---|
| \d= | Milliseconds without data receipt until end-of-input is assumed |
| \f= | Number of \d=delays before poking the remote |
| \x= | Number of milliseconds without any data before error is signaled |
| \ST \SR \SP | Resource control: limits from Start Last-rule and User-stamp for |
| \LT \LR \LR | Time, Rules-fired and Pokes-sent (i.e., ST is Time from Start, UP is |
| \UT \UR \UP | Pokes from User-Stamp) |
| \USTAMP | Store the current resource limits into the user-stamp |

During the "recognize" step, the match portion of a rule is compared to components from the working memory. The Cartesian cross-product of all combinations of matched memory items is computed in time linear in the cross-product size. (The cross-product is efficiently computed by formation of a permutation table that consists of the correct number of rows, initialized with the indices to the columns of data.) The matches are sequenced according to the time stamps of the matched memories. Such a process is well known and is shown, e.g., in Forgey, C., and McDermott, J., "The OPS Reference Manual" Carnegie-Mellon Univ. Dept. Compu. Sci., Pittsburgh, Pa., 1976 (incorporated herein by reference). The working memory match binds variables $W0, $W1 ... $W9 (in the working memory) to the values matched by the subexpressions of the match expressions. The set of all matching rules will then be considered in a comparison of the pattern portion of the rule to the data in the remote screen (as duplicated at the host).

Next, in the "select" step, the expert system checks if any matched rule also matches the current remote screen. The pattern match gives variables $0, $1 ... $9 (in the remote screen memory) that contain the values bound to the sub-expression of the pattern expression. These values are used in the subsequent condition, response, action, add and delete steps. This and subsequent steps may all use the functions and variables described in Table 4 below.

TABLE 4

Execution-time functions and variables

| Function/Variable | Purpose |
|---|---|
| $SHELL (expression) | Execute subshell, use shell's numeric exit status |
| $ENV (symbol or variable) | Use UNIX environment value for the symbol or variable |
| $ADD (expression1 expression2) | Dyadic addition |
| $SUB (expression1 expression2) | Dyadic subtraction |
| $GTIME | Universal time (GMT) |
| $GDATE | Universal date (GT) |
| $LTIME | Local time (EST) |
| $LDATE | Local date (EST) |
| $RNAME | Remote system name |
| $HOST | Host name |
| $SCRIPT | Script name |
| $varname | Use UNIX environment value for varname, if not one of the special variable names listed above in this table |

Once a rule satisfies the "match" and "pattern" components, the condition is evaluated by use of the variables that were preserved from the match and pattern phases. The first rule that passes these tests is called the "matched" rule, and its actions will be executed.

A "conflict" is said to occur when multiple rules are identified by the working memory and screen matches. In this case, one of the qualified rules must be selected by a "conflict resolution" procedure. There are two crucial features of conflict resolution, namely:

1. A rule with newer working memories is activated before a rule with older working memories.
2. A rule with more working memories is activated before a rule with fewer working memories.

The correct use of recovery information is a crucial part of any time based system. For example, consider a rule that runs the DOS chkdsk program on a remote. This action may locate several kinds of disk errors, with a remedial action to be determined by the severity of the error. Typically one logs the error, transfers the result to the central host, and possibly attempts corrective action. These activities may be invoked by adding appropriate working memory elements, in the correct order. For example, the following rule:

add: (Action CorrectError) (Action TransferError) (Action LogError)

creates three new working memory items, each with a unique timestamp:

Time1: CorrectError
Time2: TransferError

Time3: LogError

A rule that matches the LogError memory will be activated prior to a rule that matches the TransferError or CorrectError memory. If the addition to working memory had been made in a different order, then erroneous results might occur. For example:

add: (Action LogError) (Action TransferError) (Action CorrectError)

creates the timestamps:
    Time4: LogError
    Time5: TransferError
    Time6: CorrectError The rule that matches CorrectError will now match first, with the consequences that the TransferError provides erroneous results, and the LogError will not find any error to correct.

The recency rule also applies with multiple working memory matches. Consider rules that match memories with the following timestamps, listed as rule:(stamp$_1$, stamp$_2$ . . . stamp$_n$), specifically:

Rule1: (10 8 6 4)
    Rule2: (10 8 6)
    Rule3: (10 9)
    Rule4: (11)

These will be considered in the sequence Rule4, Rule3, Rule1, Rule2. This is equivalent to lexical ordering where a special "last" character is appended to each sequence. Ties are resolved in favor of rules that are earlier in the rule script source.

An example of a rule, expressed as a sequence of field names and values, is shown below:

Label:sample

Match: (Name ([A–Z] [a–z]*){$1})

Pattern: $Enter user name:

Condition:$1 .ne. "Babbage"

Response:$W1/n

Log: Notice: entered user login name

Add: (Logged in $GTIME)

Rule execution substitutes the matched variables into the action and response portions of the variable (this is called instantiation). The response is transmitted to the remote system. Immediately afterwards, the action is executed synchronously on the local system. Once the action is complete the add and delete portions are instantiated and the appropriate changes are made to working memory. The rule's "count" is decremented to show it has been used; only rules with a positive count are considered (i.e., to prevent a rule from being executed more than a desired number of times). Any modifications listed in the mods are then executed. These may change the count for any rule, or alter system parameters.

Thus, the execution cycle of the expert system of the invention can be summarized as follows:

(1) Initialization
    Read rule file
    Create a persistent shell process to receive commands and provide responses.
    Establish connection to a remote system and establish a "copy" of the remote screen in the shell.

(2) For each rule with a positive "count":
    Identify the working memory elements that match each regular expression variable in the "match" part of the rule
    Form the Cartesian cross-product of these elements (in time equal to the number of results)
    Place the results into the "eligible" list according to number and time stamps of the memories (3) For each result in the eligible list:
    For each line in the "line" component of the rule
        If the regular expression pattern and variables in the "pattern" match the current line of the current screen
        Evaluate the conditional expression (if any). Substitute a matched value from the working memory match for each $Wi variable in the "condition" expression. Substitute a matched value from the screen match for each $i variable in the "condition" expression.
    Evaluate each "condition" as a logical expression.
    If all conditions are satisfied, then the matching rule has been found; proceed to the next step (4) For the matching rule (if any):
    Instantiate the "action", "response", "add" and "delete" components (if any) using the matched working memories and pattern memories
    Transmit the response to the persistent shell (this may be connected to another process, such as communication, to effect an action at a remote)
    Execute the action on the local system
    Delete old items from the working memory (if appropriate). Only the first matching working memory (i.e., youngest) will be modified
    Place new items into the working memory (if appropriate), each with a newer and unique timestamp
    Decrement the "count" of the rule
    Execute the "modifications" of the rule The screen based software typically to be run on the remote systems (i.e., the user applications 22) does not indicate end-of-output; rather it relies on the human user sitting at the remote screen to discern when the remote processing and screen-update are complete. This is often, but not always, indicated by a shell prompt such as c:>. The ambiguity about end of output can be resolved by either of the following two methods.

The host system waits up to the value of mods:\d=xxx; milliseconds for input to begin, reads all input, and again waits up to the \d=value for input to quiesce. The received input is then decoded into a full screen image at the host. If no input arrives before expiration of the \d=value, the system starts another wait of \d=duration. This wait loop repeats, up the value of the mods:\f=xxx option. Once \f-waits transpire without any response from the remote, the system executes a corrective action of transmitting a newline character to the remote. This is called "poking" the remote. The process of waiting for \d=milliseconds up to \f=times then begins anew.

The above polling and timeout method detects a quiescent remote. The correctness of the method assumes that communication delays are bounded and less than the \d=timeout value. The scripter terminates with a RESOURCELIMIT error after a total wait of \x=milliseconds with no response from the remote.

The processing and display of the remote data is also performed after about 4K bytes of data have been received from the remote, but no pattern matching on the data occurs until expiration of the mandatory wait period.

Second, rules can be written in groups that do not terminate until an expected output is received from the remote. As a simple example, when one issues the "CLS" (i.e., clear) command to a DOS PC to clear the screen, the expected output is a clear screen with the c:>on the top line. Rules wait until this string is received.

The default time value is to wait just under one second after the stream is quiescent, with a maximum of 15 seconds waiting for the first character. During remote login this can be changed to match the login timers, for example, the command "mods:\p-500;\f-60;\x-3000;" will quickly recognize the end of the prompt message. This can avoid login timeout from the remote system. The above mod command sets the wait to 0.5 seconds with a timeout of 30 seconds. If there is no output for 30 seconds the remote is "poked". If there is no output for five minutes the execution is terminated.

Peculiarities of the remote buffering software may limit the use of input stream buffering at the remote system, and thereby require that the expert system delay until the remote system is quiescent. When multiple commands are transmitted as one rule-action, an adaptation of the input-wait process (described above) needs to be instituted. For example, a "cls" command executed on a remote DOS system may produce a transmission of several hundred characters to erase the relevant portion of the screen. A "ls-alt" command can generate many lines of output, possibly reusing some characters already on the screen. When it is important not to transmit the next character until the output is complete, the read-after-write mechanism suspends processing until the remote is output-quiescent.

The "read after write" strategy waits the value of \d=for the start of input, and again \d=after receipt of the last character. Multiple commands in one action should not be utilized when any of these commands run longer than \d=without producing input. The wait state is complete after \d=milliseconds without output from the remote. There is no requirement for output from the remote, and in particular there is no repeated read-wait or "poking" of the remote system.

The read-after-write mechanism is one means to deal with the more general problem of arbitrary timing delays along the communication channel. Transmission of a new command during the remote "reset" time may have unwanted effects upon the buffer that is in transmission.

Resource control can be utilized to prevent scripts from running longer than they are supposed to, due for example to errors in the dialup connection. It is not always possible or desirable to anticipate every error mode that can occur with remotely controlled systems and international phone lines. A high level general error control mechanism is to monitor the elapsed time, number of rules executed, and number of "poke" operations (these issue a "null" command) that have been issued to restore the connection. These values are monitored from script startup, the last rule executed, and the execution of a user stamp that is part of appropriate rules.

The resource control variables are shown in Table 5, below. The "T" suffix indicates time, the "R" suffix indicates rules executed, and the "P" suffix indicates pokes executed. The S, L and U prefixes indicate start, last rule, and user stamp, respectively.

TABLE 5

Resource Control Variables

| Measured From | Elapsed Time | Number of Rules Executed | Number of input timeouts (i.e. "pokes" executed") |
|---|---|---|---|
| Script Start | \ST | \SR | \SP |
| Last Rule | \LT | \LR (not useful, always 1 since last rule) | \LP |
| User Stamp | \UT | \UR | \UP |

The three variables \ST, \SR and \SP are measured from the start of the program execution. The value of \ST is the maximum number of seconds the program may execute. The value of \SR is the maximum number of rules the program may execute. The value of \SP is the maximum number of "poke" operations that can be executed, i.e., the number of times the read of the remote system did not complete within the limits set by the \p and \f. A value of zero indicates there is no limit for the resource.

The values of \LT, \LR and \LP are measured from the last rule executed. The "\LR" option would not be useful, but is included for completeness.

The values of \UT, \UR and \UP are measured from the occurrence of a \USTAMP in the "mods:" portion of a rule that has been executed. When the \USTAMP occurs, the current time, rule count, and poke count are stored. When the difference between and actual and the stored value exceeds the \UT, \UR or \UP value, then a resource exceeded condition has occurred.

Upon exceeding resource the working memory value "RESOURCELIMIT" is initiated without reading from the remote system. There should be a rule to match this working memory and terminate execution with the appropriate return code. Users may choose to have multiple rules to either report or recover from the error. New values of the resource control should be set when such rules are executed.

A number of differences between DOS and UNIX are important in interoperability of the example described herein where the host runs on a UNIX and the remote systems are DOS. The low level support for these differences is available in the current version of XS. A subsequent version may more directly address the following concerns:

Different file systems. Filenames are different on the two systems. For example, the directory separator (/in UNIX, \ in standard DOS), the character set (uppercase-only in DOS), and the length of a filename (varies according to UNIX version). Script writers must currently be cognizant of the system that will process an action or response.

Different command names. The "dir" command for DOS is the "ls" command for UNIX. This problem can be diminished by use of MKS toolkit or similar UNIX compatibility tool on the DOS system.

The embodiment described above is designed only for text based single window applications, such as those that run on a VT100 or ANSI standard character based display screen. However, this invention is equally applicable to windowing environments, including graphical displays within each of these windows. A graphical expert system would perform pattern matching on graphic objects, instead of or in addition to words. Application areas include remote control of windows, or X; remote control of GUIs; and control of teleconferencing services and monitoring.

We claim:

1. A system for controlling an application being executed on at least one remote processor, wherein each remote processor generates remote screen data associated with said application to maintain a screen display, said system comprising:

a central processor;

a memory connected to said central processor; and a communications link connecting said central processor to said at least one remote processor;

wherein said system stores a plurality of rules in said memory, each said rule comprising a data portion and an action portion;

wherein said central processor receives said remote screen data from said remote processor and stores said remote screen data in said memory, said system executing actions based on said remote screen data in accordance with said rules by comparing said data portion of each of said rules with said remote screen data; and wherein said actions comprise generating instructions that are transmitted to said remote processor, said instructions controlling said application being executed on said remote processor.

2. The system of claim 1 wherein said memory is divided into a remote screen memory that maintains said remote screen data, a rules memory that stores a plurality of rules, and a working memory.

3. The system of claim 2 wherein said system stores, in said working memory, data that is generated by said system as a result of executing at least one rule.

4. The system of claim 3 wherein each said rule comprises a data portion and an action portion, and wherein said system compares said data portion of each rule stored in said memory to data stored in said working memory to generate a list of rules that are eligible for execution based on the result of said comparison.

5. The system of claim 4 wherein said system performs a second comparison to compare said data portion of each of said rules on said list with said remote screen data to generate a second list of rules that are eligible for execution based on the result of said second comparison.

6. The system of claim 1 wherein each said remote processor is incorporated in a personal computer that includes a monitor for displaying said screen data.

7. The system of claim 1 wherein said central processor is a UNIX processor.

8. The system of claim 1 wherein said central processor establishes a shell for communicating with each said remote processor, said shell storing said remote screen data.

9. The apparatus of claim 1 wherein said application is a program for monitoring the quality of telephone communications.

10. The method of claim 1 wherein said actions are determined based on said remote screen data, histories of prior remote screen data and prior actions executed by said central processor.

11. A method for operating a central station including a central processor to control an application being executed on at least one remote processor, wherein each remote processor generates remote screen data associated with said application to maintain a screen display, said method comprising:

establishing a communications link to a said remote processor;

receiving said remote screen data from said remote processor;

storing said remote screen data in a memory associated with said central processor;

storing a plurality of rules in said memory, each said rule comprising a data portion and an action portion;

executing commands at said central processor based on said remote screen data stored in said memory in accordance with said rules by comparing said data portion of each of said rules with said remote screen data; and transmitting instructions to said remote processor, said instructions controlling said application being executed on said remote processor.

12. The method of claim 11 wherein said system maintains said remote screen data in a remote screen memory, maintains said rules in a rules memory, and maintains data that is generated by said system as a result of executing at least one rule in a working memory.

13. The method of claim 12 wherein each said rule comprises a data portion and a command portion, and wherein said system compares said data portion of each rule stored in said memory to data stored in said working memory to generate a list of rules that are eligible for execution based on the result of said comparison.

14. The method of claim 13 wherein said system performs a second comparison to compare said data portion of each of said rules on said list with said remote screen data to generate a second list of rules that are eligible for execution based on the result of said second comparison.

15. The apparatus of claim 11 wherein said instructions consist of standard user commands to an operating system associated with said remote processor as well as input to said application, which is an unmodified user application.

16. The method of claim 11 wherein said application is a program for monitoring the quality of telephone communications.

* * * * *